United States Patent
Cimaglio et al.

(10) Patent No.: US 12,552,713 B2
(45) Date of Patent: Feb. 17, 2026

(54) LOW-COST, EFFECTIVE PHOSPHATE-BASED LIME BUCKING INHIBITOR

(71) Applicant: KNAUF GIPS KG, Iphofen (DE)

(72) Inventors: Scott Cimaglio, Grayslake, IL (US); Sriram K. Valluri, Grayslake, IL (US)

(73) Assignee: KNAUF GIPS KG, Iphofen (DE)

( * ) Notice: Subject to any disclaimer, the term of this patent is extended or adjusted under 35 U.S.C. 154(b) by 450 days.

(21) Appl. No.: 18/121,368

(22) Filed: Mar. 14, 2023

(65) Prior Publication Data
US 2024/0043333 A1 Feb. 8, 2024

Related U.S. Application Data

(60) Provisional application No. 63/395,440, filed on Aug. 5, 2022.

(51) Int. Cl.
| | |
|---|---|
| *C04B 28/14* | (2006.01) |
| *C04B 22/16* | (2006.01) |
| *C04B 24/06* | (2006.01) |
| *C04B 40/00* | (2006.01) |
| *C04B 103/12* | (2006.01) |
| *C04B 103/22* | (2006.01) |
| *C04B 111/00* | (2006.01) |

(52) U.S. Cl.
CPC .............. *C04B 28/14* (2013.01); *C04B 22/16* (2013.01); *C04B 24/06* (2013.01); *C04B 40/0042* (2013.01); *C04B 2103/12* (2013.01); *C04B 2103/22* (2013.01); *C04B 2111/00577* (2013.01)

(58) Field of Classification Search
CPC ......... C04B 28/14; C04B 22/16; C04B 24/06; C04B 40/0042; C04B 2103/12; C04B 2103/22; C04B 2111/00577; C04B 2111/0062; C04B 28/147
See application file for complete search history.

(56) References Cited

U.S. PATENT DOCUMENTS

| | | |
|---|---|---|
| 2,078,199 A | 4/1937 | King |
| 3,410,655 A | 11/1968 | Ruter et al. |
| 3,573,947 A | 4/1971 | Kinkade et al. |
| 5,746,822 A | 5/1998 | Espinoza |
| 6,342,284 B1 | 1/2002 | Yu et al. |
| 6,815,049 B2 | 11/2004 | Veeramasuneni et al. |
| 6,822,033 B2 | 11/2004 | Yu et al. |
| 7,056,964 B2 | 6/2006 | Lettkeman et al. |
| 8,323,785 B2 | 12/2012 | Yu et al. |
| 9,682,887 B2 | 6/2017 | Grussing et al. |
| 2006/0048680 A1 | 3/2006 | Arese et al. |
| 2013/0330532 A1 | 12/2013 | Dierschke et al. |
| 2017/0129813 A1 | 5/2017 | Yu et al. |
| 2019/0315659 A1 * | 10/2019 | Pelot ............... C04B 22/064 |

FOREIGN PATENT DOCUMENTS

| | | | |
|---|---|---|---|
| CN | 101857412 A | 10/2010 | |
| CN | 104529357 A | 4/2015 | |
| CN | 104860600 A | 8/2015 | |
| CN | 110028263 A | 7/2019 | |
| CN | 113582654 A | 11/2021 | |
| RU | 2356863 C1 * | 5/2009 | .......... C04B 11/024 |
| RU | 2404146 C | 11/2010 | |
| WO | WO2016/040047 A1 | 3/2016 | |

OTHER PUBLICATIONS

Machine Translation of China Patent Specification No. CN 101857412 A (Year: 2010).*
PCT Search Report dated Nov. 17, 2023 for PCT Application No. PCT/US2023/029110.

* cited by examiner

*Primary Examiner* — Anthony J Green

(74) *Attorney, Agent, or Firm* — Greer, Burns & Crain, Ltd; Pradip Sahu

(57) ABSTRACT

A dry construction plaster composition made with at least stucco in an amount from about 25 to about 99 wt %; hydrated lime in an amount from about 0.5 to about 75 wt %; a phosphate-based lime bucking inhibitor in an amount from about 0.01 to about 1 wt %; and a setting reaction controlling agent, wherein the setting reaction controlling agent comprises a set accelerator, a set inhibitor, or any combination thereof is provided. Methods for preparing construction plaster slurries and pastes with reduced lime bucking and methods for finishing a substrate are also provided.

14 Claims, 7 Drawing Sheets

| Lime-Bucking Measurements | | | | | | | | | | | |
|---|---|---|---|---|---|---|---|---|---|---|---|
| | Test Material | Grams Test Material | Additive | Water | Vicat t2 | Vicat t12 | Δ in 10 min | Δ from control at t12 | TRS | Comment | pH, t12 |
| A | sample b | 600 | Control | 360 | 9 | 6.5 | -2.5 | n/a | 111.0 | | not measured |
| B | sample b | 600 | STMP | 360 | 9 | 9 | 0.0 | 0.00 | 149.0 | v minor buck | 12.9 |
| C | sample b | 600 | Monobasic sodium phosphate | 360 | 9 | 4 | -5.0 | -5 | 110.0 | | 13.1 |
| D | sample b | 600 | tribasic sodium phosphate | 360 | 12 | 9 | -3.0 | 0.00 | 140.0 | No buck | 13.0 |
| E | sample b | 600 | TSP | 360 | 11.5 | 5 | -6.5 | -4 | 109.0 | | 12.9 |
| F | sample b | 600 | DDS | 360 | 10 | 5 | -5.0 | -4 | 116.0 | | 13.0 |
| G | sample b | 600 | Sodium Stearate | 360 | 10.5 | 6 | -4.5 | -3 | 110.0 | | 13.0 |
| H | sample b | 600 | SLSA | 360 | 9.5 | 3 | -6.5 | -6 | 100.0 | | 13.0 |
| L | sample c | 600 | Control | 365 | 8 | 3.0 | -5.0 | n/a | 118.5 | | not measured |
| M | sample c | 600 | TSP | 365 | 11 | 5.0 | -6.0 | -3.0 | 135.0 | | not measured |
| O | sample c | 600 | Tribasic Phosphate | 365 | 13 | 3.0 | -10.0 | -5.0 | 135.0 | | not measured |
| N | sample c | 600 | TSP | 365 | 17.5 | 10.0 | -7.5 | 2.00 | 149.0 | | not measured |
| P | sample c | 600 | Control | 370 | 8 | 3.0 | -5.0 | n/a | 114.0 | | not measured |
| q | sample c | 600 | stpp | 370 | 17 | 9.0 | -8.0 | 1.00 | 124.0 | | not measured |
| r | sample c | 600 | stpp | 370 | 16 | 12.0 | -4.0 | 4.00 | 164.0 | | not measured |
| s | sample c | 600 | KTPP | 370 | 15 | 1.0 | -14.0 | -7.0 | 180.0 | | not measured |
| T | sample c | 600 | tsp/stpp | 370 | 15 | 10.0 | -5.0 | 2.0 | 164.0 | | not measured |
| U | sample c | 600 | stpp/naPtri-b17 | 370 | 17 | 10.0 | -7.0 | 2.0 | 180.0 | | not measured |
| V | sample b | 600 | control | 370 | 13 | 4.0 | -9.0 | n/a | 91.0 | | not measured |
| W | sample b | 600 | sodium tripolyphosphate | 370 | 20 | 15.0 | -5.0 | 2.0 | 117.00 | | not measured |
| X | sample b | 600 | sodium pyrophosphate | 370 | 16 | 14.0 | -2.0 | 1.0 | 189.00 | | not measured |
| Y | sample b | 600 | NaCO3 | 370 | 15 | 2.0 | -13.0 | -11.0 | 96.00 | | not measured |

Fig. 7

LOW-COST, EFFECTIVE PHOSPHATE-BASED LIME BUCKING INHIBITOR

CROSS-REFERENCE TO RELATED APPLICATIONS

This application claims the benefit of priority to the U.S. provisional patent application 63/395,440 filed Aug. 5, 2022, the entire disclosure of which is herein incorporated by reference in its entirety.

TECHNICAL FIELD

This disclosure relates to construction plasters, dry construction plaster mixtures which can be packaged and stored in bags more efficiently than traditional construction plasters, and methods for preventing lime bucking.

BACKGROUND

Construction plaster is a building construction product commonly used in many applications, including as a veneer coating that can be applied over certain wallboard or over other substrates. Formulated and supplied as dry powder, construction plaster contains stucco and hydrated lime as two main components. A user may mix construction plaster with water and then apply the resulting paste, putty or slurry to a substrate. After being mixed with water, calcined gypsum hydrates and sets, forming an interlocking matrix of calcium sulfate dihydrate and producing a solid veneer coating.

Lime bucking is a condition which manifests itself as a sudden thickening (stiffness) of construction plaster after it has been mixed with water. When lime bucking occurs, a plaster mortar loses its ability to flow and may become a highly viscous putty which may not be suitable as a trowelable material unless remixed. While the mechanism of lime bucking is not fully understood, it is believed that lime bucking may be resulting from interaction between stucco and hydrated lime.

Thus, there remains a need for construction plaster formulations that are less susceptible to lime bucking as well as for methods that prevent, minimize and/or reverse lime bucking in construction plaster slurries and pastes.

SUMMARY

This disclosure provides construction plaster formulations that comprise a lime bucking inhibitor and methods for reducing and/or preventing lime bucking.

In a first aspect, the disclosure relates to a dry construction plaster composition comprising:
- stucco in an amount from about 25 to about 99 wt %;
- hydrated lime in an amount from about 0.5 to about 75 wt %;
- a phosphate-based lime bucking inhibitor in an amount from about 0.01 to about 1 wt %; and
- a setting reaction controlling agent, wherein the setting reaction controlling agent comprises a set accelerator, a set inhibitor, or any combination thereof.

In some embodiments, the dry construction plaster composition may comprise the set accelerator in an amount from about 0.001 to about 0.1 wt %. In some dry construction plaster compositions according to this disclosure, stucco in the mixture may contain beta stucco and/or hydrated lime may be dolomitic hydrated lime. In some dry construction plaster compositions according to this disclosure, the phosphate-based lime bucking inhibitor may include at least one orthophosphate and/or at least one polyphosphate. Some preferred phosphate-based lime bucking inhibitors may include, but are not limited to, trisodium phosphate (TSP), sodium tripolyphosphate (STPP), sodium trimetaphosphate (STMP), or any combination thereof. Some preferred set accelerators may contain one or more of the following: calcium sulfate (anhydrous), calcium sulfate dihydrate, calcium sulfate dihydrate co-ground with sugar, potassium sulfate, aluminum sulfate, sodium sulfate, sodium disulfate or any mixture thereof. In some embodiments, the dry construction plaster compositions according to this disclosure may comprise one or more of the following set inhibitors: diethylenetriaminepenta-acetate (DTPA), pentasodium DTPA, cream of Tartar (potassium bitartrate), citric acid, maleic acid, succinic acid, tartaric acid and/or their salts. In some embodiments, the dry construction plaster compositions may comprise sodium tripolyphosphate, calcium sulfate dihydrate co-ground with sugar, potassium bitartrate and/or maleic acid. In some embodiments, any of the dry construction plaster compositions according to this disclosure may further comprise one or more aggregates and/or one or more additives. Some preferred dry construction plaster compositions may comprise one or more of the following: sand, expanded perlite, clay, a defoamer, a thickener, or any combination thereof.

In a second aspect, this disclosure relates to a method for mixing construction plaster slurry or paste, the method comprising mixing one or more of the dry construction plaster compositions of this disclosure with water. The method may further comprise adding at least one aggregate and/or at least one additive. Preferably, the dry construction plaster composition may be mixed with water in an amount in the range from about 0.20 to about 0.75 liters of water per one kilogram of the dry constructions plaster composition.

In a third aspect, this disclosure relates to a method for finishing a substrate, the method comprising:
a) mixing a construction plaster slurry or paste containing at least water and one or more dry construction plaster compositions according to this disclosure; and
b) applying the slurry or paste to the substrate, preferably the substrate is wallboard and preferably, applying is performed by using a hawk, trowel or a spray applicator.

BRIEF DESCRIPTION OF THE DRAWINGS

FIG. 7 reports results of lime-bucking experiments for construction plaster formulations with the phosphate-based lime bucking inhibitors according to this disclosure.

DETAILED DESCRIPTION

Figure 1:
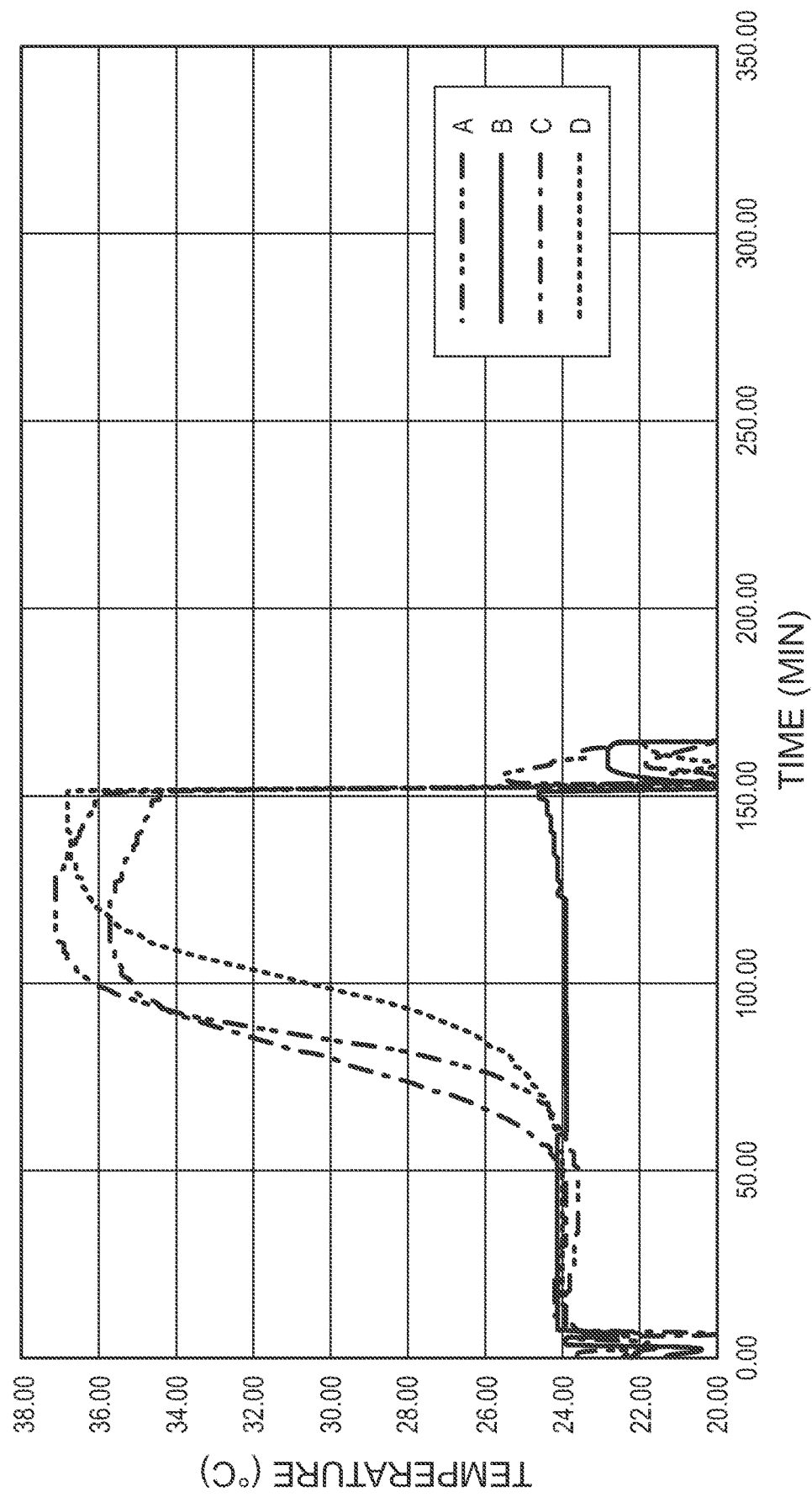
FIG. 1 is a graph reporting temperature rise measurements for construction plaster formulations A through D.

In one aspect, this disclosure relates to a phosphate-based lime bucking inhibitor and construction plaster comprising the inhibitor. In another aspect, this disclosure relates to methods for preventing premature thickening (lime bucking) in construction plaster comprising hydrated lime.

Construction plasters according to this disclosure include dry mixtures which comprise at least stucco, hydrated lime, one or more phosphate-based lime bucking inhibitors, and one or more from at least one set accelerator and at least one set retarder (inhibitor). In some preferred embodiments, construction plasters according to this disclosure may further comprise one or more of the following additives: sand, expanded perlite, clay, starch, a defoamer, a thickener, or any combination thereof. Other additives that are used in conventional construction plasters may be also suitable.

In this disclosure, the term "calcined gypsum" may be used interchangeably with calcium sulfate hemihydrate, stucco, calcium sulfate semi-hydrate, calcium sulfate half-hydrate or plaster of Paris, aka $CaSO_4 \cdot \frac{1}{2}H_2O$.

In this disclosure, the term "gypsum" may refer to any of the following: naturally mined gypsum (ore), landplaster and/or synthetic gypsum. The term "gypsum" may be used interchangeably with the term "calcium sulfate dihydrate," aka $CaSO_4 \cdot 2H_2O$. The term "synthetic gypsum" can be also referred to as "chemical gypsum" Or flue gas desulfurization (FGD) gypsum.

In this disclosure, the term "hydrated lime" may refer to hydrated lime produced by a hydration reaction of quicklime (lime, calcium oxide, CaO) which was derived from natural deposits of limestone (calcium carbonate, $CaCO_3$), or natural deposits of dolomitic quicklime (dolomitic lime, $CaO \cdot MgO$) which was derived from dolomitic limestone (calcium magnesium carbonate, $CaCO_3 \cdot MgCO_3$). Preferably, hydrated lime is dolomitic hydrated lime obtained by the following hydration reaction:

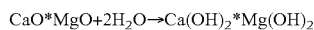
$$CaO \cdot MgO + 2H_2O \rightarrow Ca(OH)_2 \cdot Mg(OH)_2$$

In this disclosure, the term "formulation" may be used interchangeably with the term "composition" and/or "mixture."

In this disclosure, a composition (formulation or mixture) may be referred to as "dry" composition or mixture. In this disclosure "dry" means that no water was added to the composition or mixture. Nevertheless, a dry composition or dry mixture may have some moisture content. For example, a dry construction plaster mixture may have a moisture content of about 1 wt % or less, about 0.05 wt % or less, or about 0 wt %. It should be noted that water molecules bound with stucco or gypsum are not being considered as "free-water."

In this disclosure, the term "about" means a range of plus/minus 5% of the stated value. For example, "about 100" means 100±5 and "about 200" means 200±10.

In this disclosure, the term "wt %" means percentage by weight.

When calcined gypsum ($CaSO_4 \cdot \frac{1}{2}H_2O$) is mixed with water into a slurry or paste, calcined gypsum hydrates and sets into a gypsum matrix. This setting reaction can be described by the following equation:

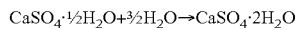
$$CaSO_4 \cdot \tfrac{1}{2}H_2O + \tfrac{3}{2}H_2O \rightarrow CaSO_4 \cdot 2H_2O$$

In this disclosure, "the working time" refers to a time period, e.g., 10 minutes, 30 minutes or 2 hours, by the end of which a slurry sufficiently hardens or sets into a gypsum matrix and is no longer considered workable.

In this disclosure, "calcination" means a process by which gypsum ($CaSO_4 \cdot 2H_2O$) is dehydrated into calcined gypsum ($CaSO_4 \cdot \frac{1}{2}H_2O$). The process includes heating gypsum to drive off chemically bound water. Calcined gypsum can be produced in different crystalline forms such as alpha calcium sulfate hemihydrate and beta calcium sulfate hemihydrate. All crystalline forms and any mixtures thereof are suitable for compositions according to this disclosure.

A first component in dry construction plaster mixtures according to this disclosure is stucco (calcined gypsum) which can be used in any crystalline form, including in alpha crystalline form, beta crystalline form, or any mixtures thereof. Methods for production of alpha and/or beta calcined gypsum are well known in the art and any of such methods can be used. For example, U.S. Pat. No. 3,410,655 to Ruter et al., incorporated herein by reference in its entirety, teaches producing alpha calcium sulfate hemihydrate. Ruter et al. states the alpha-hemihydrate forms non-needle like crystals, as opposed to the beta calcium sulfate hemihydrate which forms needle-like crystals. Ruter et al. also states the usual plaster of Paris (calcium sulfate hemihydrate) is the beta calcium sulfate hemihydrate. However, depending on the manner of preparation, the plaster of Paris can still contain anhydrous calcium sulfate, and/or alpha calcium sulfate hemihydrate.

The dry construction plaster mixture (composition) according to this disclosure may comprise stucco in an amount within the range from about 25 to about 99 wt %, preferably in the range from about 45 to about 90 wt %, and most preferably from about 70 to about 85 wt %.

A second component in the dry construction plaster mixtures according to this disclosure is hydrated lime, and preferably hydrated lime is dolomitic hydrated lime which may be further modified by milling, e.g., it can be finely ground. Preferred dolomitic hydrated lime includes Type S dolomitic hydrated lime in accordance with ASTM C 206 and ASTM C 207.

The dry construction plaster mixture according to this disclosure may comprise hydrated lime, preferably dolomitic hydrated lime, in an amount within the range from about 0.5 to about 75 wt %, preferably in the range from about 5 to about 50 wt %, and most preferably from about 10 to about 30 wt %.

A third component in the dry construction plaster mixtures according to this disclosure is a phosphate-based lime bucking inhibitor. Suitable phosphate-based lime bucking inhibitors according to this disclosure include compounds that contain one or more phosphoric acid units. Particularly preferred are orthophosphates, including trisodium phosphate (tribasic sodium phosphate, TSP), monoammonium phosphate, monosodium phosphate (monobasic sodium phosphate), or any combination thereof. Suitable polyphosphate compounds include both cyclic and acyclic compounds with two or more phosphoric acid units. Preferred polyphosphates include trimetaphosphate salts and tetrametaphosphate salts. Particularly preferred polyphosphates include sodium tripolyphosphate (STPP), sodium trimetaphosphate (STMP), potassium trimetaphosphate, lithium trimetaphosphate, ammonium trimetaphosphate, tetrasodium pyrophosphate (sodium pyrophosphate, tetrasodium phosphate, or TSPP) or any combination thereof.

The dry construction plaster mixture according to this disclosure may comprise one or more phosphate-based lime bucking inhibitors in an amount within the range from about 0.01 to about 1 wt %, preferably in the range from about 0.025 to about 0.5 wt %, and most preferably from about 0.05 to about 0.25 wt %.

It is known in the art that non-calcium phosphate bearing compounds can be used for retarding a setting reaction in ready-mixed setting type joint compounds which are stored after being pre-mixed with water, as disclosed in U.S. Pat. No. 5,746,822, the entire disclosure of which is herein incorporated by reference.

A fourth component in the dry construction plaster mixtures according to this disclosure is at least one setting reaction controlling agent. Such agents may include set accelerators and/or set inhibitors. Set accelerators, which can be also referred to as set accelerating agents, are commonly used for accelerating a setting reaction of calcined gypsum. Some preferred set accelerators may include, but are not limited to, calcium sulfate (anhydrous), calcium sulfate dihydrate, potassium sulfate, aluminum sulfate, sodium sulfate, sodium disulfate, or any combination thereof.

One preferred set accelerator for construction plasters according to this disclosure includes calcium sulfate dihydrate that has been finely ground. In some embodiments, calcium sulfate dihydrate may be formulated as the climate stabilized accelerator ("CSA") which may contain about 95% of calcium sulfate dihydrate co-ground with 5% sugar and then heat processed, as was originally described in U.S. Pat. No. 3,573,947. In some embodiments, calcium sulfate dihydrate may be formulated as a heat resistance accelerator ("HRA") which comprises calcium sulfate dihydrate freshly co-ground with sugar, e.g., sucrose or dextrose at a ratio of about 5 to about 25 pounds of sugar per 100 pounds of calcium sulfate dihydrate, as was originally described in U.S. Pat. No. 2,078,199.

The dry construction plaster mixture according to this disclosure may comprise one or more of any of these set accelerators in any amount suitable for accelerating the setting reaction sufficiently, and generally in any amount less than 1 wt %. Some embodiments of the dry construction plaster mixture according to this disclosure may contain one or more of set accelerators in any amount within the range from about 0.001 to about 0.1 wt %, preferably in the range from about 0.001 to about 0.075 wt %, and most preferably in the range from about 0.005 to about 0.05 wt %.

In addition to one or more of the set accelerators, the dry construction plaster mixture according to this disclosure may also comprise set inhibitors which may be added in order to increase the working time of the plaster slurry mixed with water. Suitable set inhibitors may include, but are not limited to, one or more of the following: diethylenetriaminepentaacetic acid (DTPA) or salts thereof, such as sodium DTPA, cream of Tartar (potassium bitartrate) and/or various acids such as citric acid, maleic acid, succinic acid, tartaric acid and/or their respective salts, e.g., sodium, potassium and/or ammonium. Some preferred embodiments may include cream of Tartar (potassium bitartrate) and/or sodium citrate as a set inhibitor.

The dry construction plaster mixture according to this disclosure may comprise one or more of any of these set inhibitors in any amount suitable for increasing a working time of the plaster paste sufficiently, and generally in any amount less than 1 wt %. Some embodiments of the dry construction plaster mixture according to this disclosure may contain one or more of set inhibitors in any amount within the range from about 0.001 to about 0.1 wt %, preferably in the range from about 0.001 to about 0.075 wt %, and most preferably, in the range from about 0.005 to about 0.05 wt %.

In some preferred embodiments, a combination of set inhibitors, set accelerators and their amounts can be adjusted such that a working time of a plaster paste or slurry may be in the range from about 10 minutes to about 2.5 hours. In some embodiments, the set inhibitors and/or set accelerators may be added to the dry construction plaster mixture by a user. Furthermore, any delay in set cause by inclusion of a phosphate based bucking inhibitor can be eliminated with by including one or more set control agents.

Figure 3:
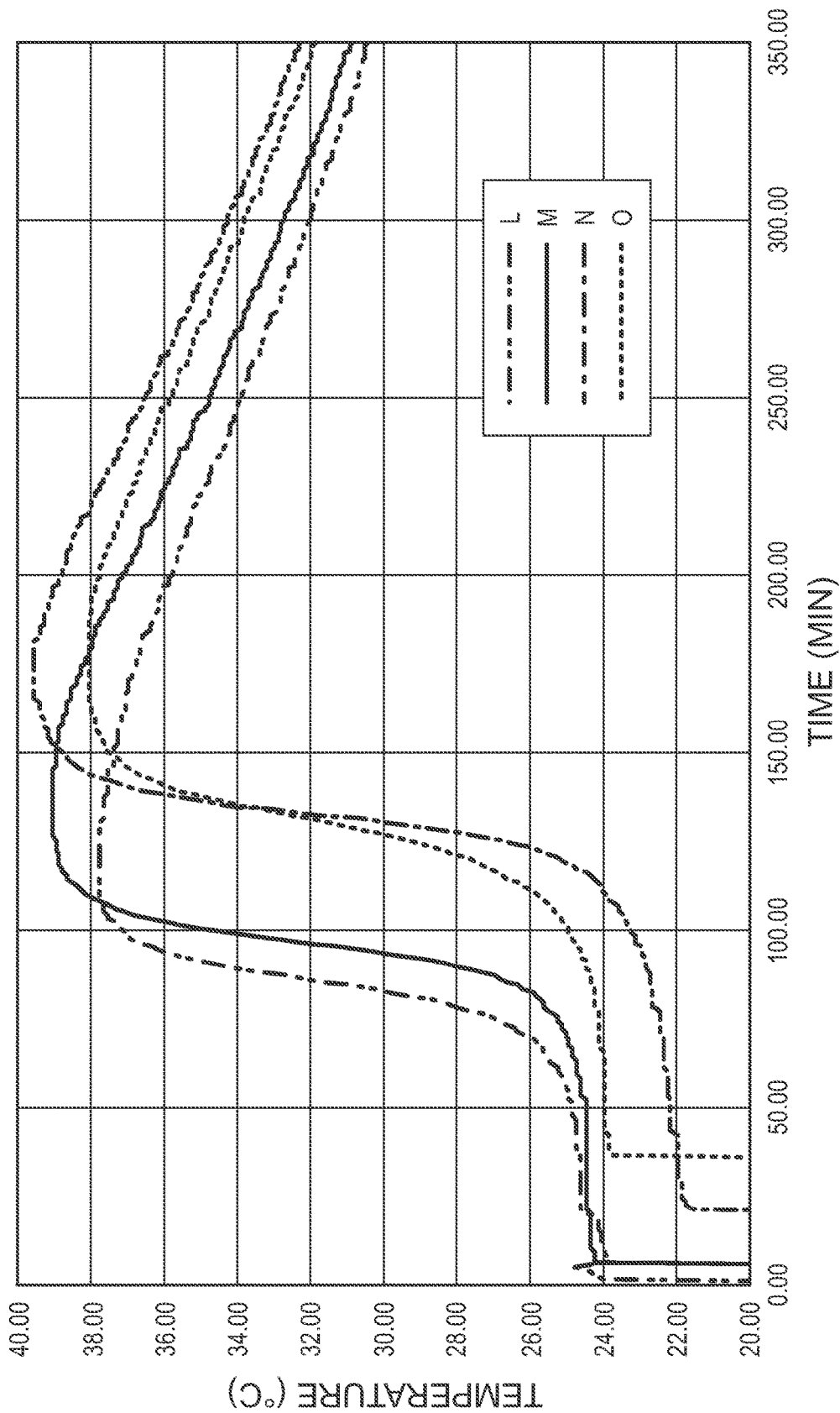
FIG. 3 is a graph reporting temperature rise measurements for construction plaster formulations L through O.
Figure 4:
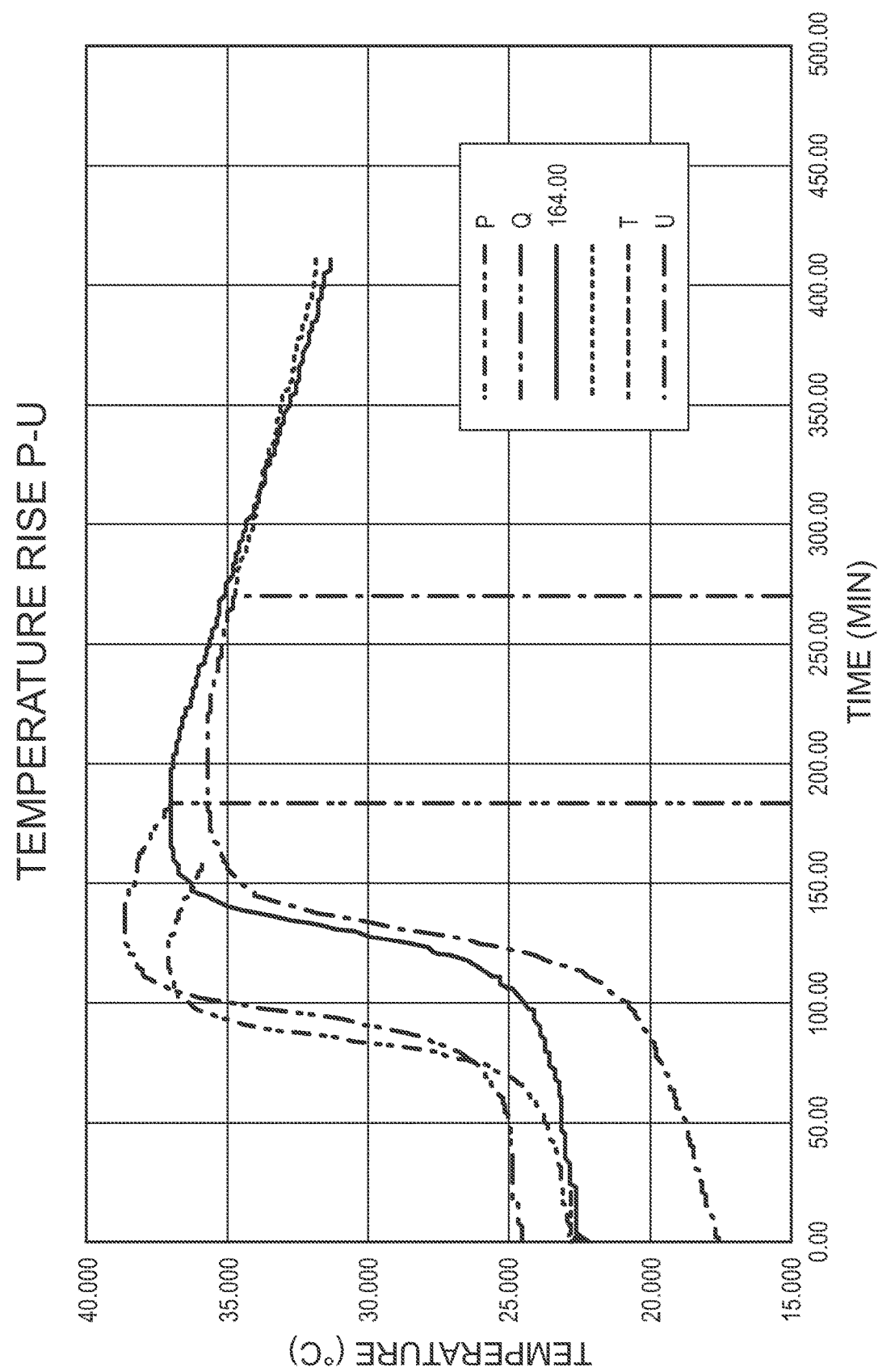
FIG. 4 is a graph reporting temperature rise measurements for construction plaster formulations P through U.
Figure 5:
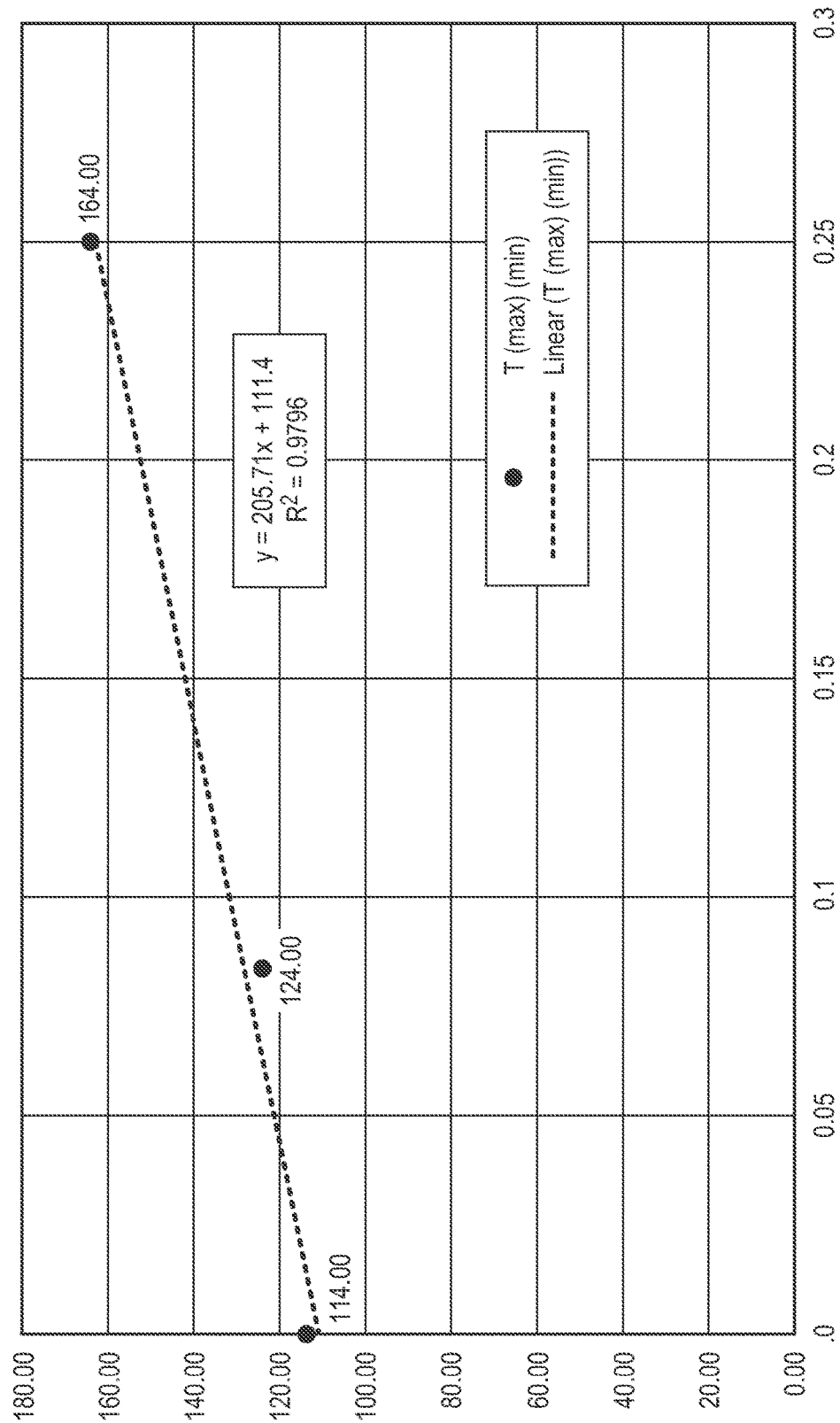
FIG. 5 is a graph reporting the retardation as a function of sodium tripolyphosphate (STPP) concentration.

With a reference to FIGS. 1 through 6, it has been unexpectedly found that phosphate-based lime bucking inhibitors according to this disclosure may be used in amounts sufficient to prevent and/or minimize lime bucking, but without retarding significantly the setting reaction. Construction plaster mixtures according to this disclosure which contain one or more phosphate-based lime bucking inhibitors include those which have the working time in the range from about 10 minutes to about 3 hours. As is shown in FIG. 5, one of the preferred phosphate-based lime bucking inhibitors, sodium tripolyphosphate (STPP), can be used in amounts which do not delay a setting reaction more than 2.5 hours, yet these amounts are sufficient for preventing/minimizing lime bucking.

FIGS. 1 through 6 report results from an adiabatic calorimetry test, herein described as Temperature Rise Set (TRS) test. For the TRS test, a slurry is mixed from a dry stucco construction plaster mixture and water, a composition for each slurry is reported in Example 1. The slurry is then poured into a cup which is then placed into an insulated styrofoam container in order to minimize heat transfer to the environment. A temperature probe is placed into the middle of the slurry, and the temperature is recorded every 5 seconds. The setting reaction is exothermic, and its temperature rises as the reaction proceeds and the slurry sets. Eventually, the reaction reaches its maximum temperature at which the temperature reaches a maximum or inflection point. The maximum temperature recorded for the setting reaction during the TRS test, as can be seen in graphs of FIGS. 1-6 as well as in the tables of Example 1.

In addition to the main four components, the dry construction plaster mixture according to this disclosure may further comprise one or more aggregates such as sand, calcium carbonate, perlite, expanded perlite, clay, expanded clay, talc, mica, vermiculite, rock, gravel, hollow microspheres, or any combination thereof. One or more aggregates can be premixed and packaged with the dry construction plaster mixture and/or one or more aggregates may be added to the dry construction plaster mixture by a user when mixing a plaster paste or slurry with water.

Suitable sands may include, but are not limited to, river sand, Mohawk medium sand, Rich Mix fine sand, Atlanta sand, Dothan Sand, and Florida sand. Fine sands can be used in combination with coarser sands. If present, sand can be used in an amount up to 70 wt %, preferably in an amount in the range from about 5 to about 60 wt %, and most preferably from about 20 to about 50 wt % of the aggregate-free components on a dry basis, e.g., 5 to 60 parts by weight of sand can be added per 100 parts of the dry construction plaster mixture.

Other aggregates such as for example, perlite, expanded perlite, vermiculite, calcium carbonate, talc, mica, hollow microspheres, or any combination thereof can be also optionally used in addition to, or instead of sand. Any other aggregates typically used in with conventional construction plasters may be also used. If present, perlite may be used in an amount in the range from about 0 wt % to about 30 wt %, and more preferably from about 0 wt % to about 15 wt %, and most preferably from about 0 wt % to about 12.5 wt %.

Various other additives may be also used for improving the workability of the construction plaster slurry and its overall performance. Such additives may include, but are not limited to, clay, starch, a thickener, a defoamer, or any combination thereof. One or more additives can be premixed and packaged with the dry construction plaster mixture and/or one or more additional additives may be added to the dry construction plaster mixture by a user when mixing a plaster paste or slurry with water.

In some embodiments, a dry construction plaster mixture according to this disclosure may comprise one or more clays, which can be used as a non-leveling agent. Examples of suitable clays include, but are not limited to, attapulgite, bentonite, kaolinite and/or sepiolite. If used, one or more clays may be used in any amount up to about 4 wt % of the dry construction plaster mixture, e.g., from about 0 wt % to about 4 wt %, and more preferably from about 0 wt % to about 2 wt %, and most preferably from about 0 wt % to about 0.25 wt %.

The dry construction plaster mixtures according to this disclosure may comprise one or more of cellulose ethers as a thickener in order to improve suspension of an aggregate and prevent its sedimentation from the paste/slurry. For example, hydroxyethyl cellulose (HEC), hydroxyethyl methyl cellulose (HEMC, available under the tradename WALOCEL™ from Dow Inc., United States), hydropropylmethyl cellulose (HPMC, METHOCEL™ from Dow Inc., United States) methyl cellulose (MC, Mecellose™, Lote Chemical) and sodium carboxymethyl cellulose (CMC) can be used. If used, a thickener may be used in any amount up to about 20 wt % of the dry construction plaster mixture, e.g., from about 0 wt % to about 20 wt %, and more preferably from about 0 wt % to about 10 wt %, and most preferably from about 0 wt % to about 5 wt %.

Starches are commonly used in gypsum slurries from which a gypsum wallboard is made, including as described in U.S. Pat. No. 5,746,822, the entire disclosure of which is herein incorporated by reference. In some embodiments, the dry construction plaster compositions according to this disclosure may comprise a starch, which may be a pregelatinized starch, and preferably pregelatinized corn starch. Other suitable starches may include, but are not limited to, acid-modified starches, such as acid-modified corn flour and/or non-pregelatinized wheat starch. If used, a starch may be used in any amount up to 10 wt % of the dry construction plaster mixture, e.g., from about 0 wt % to about 10 wt %, and more preferably from about 0 wt % to about 5 wt %, and most preferably from about 0 wt % to about 1 wt %.

In some embodiments, a dry construction plaster mixture according to this disclosure may further comprise one or more defoamers which may be helpful in preventing formation of air bubbles and foam during mixing with water.

Suitable defoamers include, but are not limited to, those which are based on fatty alcohol-alkoxylates and polysiloxane on an inorganic carrier material, commercially available under trade name VINAPOR™ DF 9010F which is a powder defoamer based on fatty alcohol alkoxylates and polysiloxanes on an inorganic carrier material (BASF, Germany). Other defoamers in powder form can be also used.

If used, a defoamer may be used in any amount up to about 2 wt % of the dry construction plaster mixture, e.g., from about 0 wt % to about 2 wt %, and more preferably from about 0 wt % to about 1 wt %, and most preferably from about 0 wt % to about 0.25 wt %.

In another aspect, this disclosure relates to construction plaster slurry or paste or putty in which one or more of the dry construction plaster compositions according to this disclosure are mixed with at least water, preferably by a user at the construction site. An amount of water to be used may depend on formulation aspects, including the amount of aggregate, the level of hydrated lime or stucco and the addition of any other additives. If a more fluid slurry is needed, more water should be added. If a less fluid slurry (paste) may be needed, then less water should be added, taking into account a method by which the slurry/paste will be applied to a substrate. In some embodiments, water may be added in an amount in the range 0.25 liters to 0.75 liters per kg plaster material.

In some embodiments of the construction plaster slurry/paste, a user may further add one or more aggregates and/or one or more additives.

In yet another aspect, this disclosure relates to methods for finishing a substrate. These methods include mixing one or more of the dry construction plaster mixtures of this disclosure with water into a construction plaster slurry (paste or putty), optionally adding one or more aggregates and/or other additives, e.g., a set reaction accelerator and/or retarder (inhibitor), and applying the slurry to a substrate. Mixing methods may include using a cage-type paddle driven by a heavy-duty drill. Amount of water to be used may be adjusted as needed, but preferably from about 12 to about 38 liters of water or from about 5 to about 25 liters of water may be used per one 50-pound bag of the dry construction plaster mixture of this disclosure. After the mixing is completed, the resulting gypsum construction plaster slurry (paste or putty) may be applied to a substrate by any conventional method, for example, by using a hawk, trowel or a spray applicator. Suitable substrates include, but are not limited to, gypsum wallboard (drywall), brick walls, wood planks, or suitable lath, etc. Depending upon the substrate and in order to improve adhesion of the gypsum construction plaster to the substrate, and in order to provide optimal water absorption of the substrate application methods may comprise pretreating the substrate with a suitable coating before prior to the application of the gypsum construction plaster to the substrate.

Lime bucking that manifests itself in a sudden thickening of the construction plaster after it is mixed with water is known to be a phenomenon related to atmospheric conditions. Lime bucking can be present in varying degrees of severity, and the time required to thicken can vary from about 1 or 20 seconds to about 20 minutes. For conventional construction plaster dry mixtures, it was found that it is necessary to package these mixtures into air-tight bags in order to reduce the occurrence and/or severity of lime bucking. One of the technical advantages of the gypsum construction plaster mixtures according to this disclosure that comprise one or more of the phosphate-based lime bucking inhibitors according to this disclosure is that the lime bucking is significantly reduced (by at least one grade of severity e.g. from moderate to slight) or delayed (by at least 2 minutes) in comparison to conventional construction plaster mixtures which do not comprise the one or more of the phosphate-based lime bucking inhibitors. Accordingly, the dry construction plaster mixtures of this disclosure may be packaged in bags that do not need to be air tight. Furthermore, as the construction plaster mixtures are less susceptible to bucking even in under humid conditions, it is possible to use packaging with thinner paper, reducing an amount of paper used and decreasing the environmental footprint. Yet another technical advantage of the dry construction plaster mixture of this disclosure is that since bucking is reduced, a user/applicator does not need to re-mix these plaster mixtures or may need to do so less often than with conventional mixtures. This provides savings in labor and time.

Referring to FIG. 7, it reports results of lime-bucking experiments. The following test, as was described in U.S. Pat. No. 9,682,887, was used in this disclosure to evaluate lime bucking. The severity of lime bucking was evaluated using a modified Vicat apparatus described in Section 8 of ASTM C-472 to measure the cone penetration at 10 min (unless otherwise indicated) after the start of mixing. The total weight of the rod and conical plunger was 35 g. If two or more measurements were taken at different times, the conical plunger was wiped clean, and a determination was made on a new area of the sample in the filled ring mold. The testing was performed at room temperature (about 25° C.).

All formulations, compositions of which are listed in Example 1, were mixed at a 60-cc consistency. The samples were allowed to soak for 1 min and were mixed by hand for 90 sec. The severity of the lime bucking was rated on the following scale:

TABLE 1

SCALE FOR RATING LIME BUCKING

| Cone Penetration | Lime Bucking Severity |
| --- | --- |
| More than 25 mm | None |
| 20-25 mm | Trace |
| 15-20 mm | Slight |
| 10-15 mm | Moderate |
| 5-10 mm | Severe |
| Less than 5 mm | Unusable |

In this test, when the number is on the border between two ratings, both are used; for example, a penetration of 10 mm would be rated as moderate to severe.

The invention will be now further described with the following non-liming examples.

Example 1. Preparing and Testing Construction Plaster Compositions

A control dry construction plaster mixture (Diamond® Veneer Finish, available from United States Gypsum Company, Chicago, Illinois, USA) was prepared as follows:

TABLE 2

Diamond Veneer Finish

| Component | Wt % |
| --- | --- |
| Stucco | 84.78 |
| Type S Hydrated Lime | 15.14 |
| Cream of Tartar | 0.06 |
| Maleic Acid | 0.01 |
| CSA Accelerator | 0.01 |
| Total | 100 |

This control mixture was then mixed with various phosphate-based lime bucking inhibitors or other components into mixtures A-Y as shown in tables below. All mixtures were then tested for temperature rise and results from these experiments are reported in FIGS. 1-6. These mixtures were also tested in the lime-bucking experiments, and results of these tests are reported in FIG. 7.

The additives used in mixtures A-D were as shown in Table 3 below:

TABLE 3

Mixtures A-D

| | Test Material | Test Material (g) | Additive | Additive (g) | Water |
| --- | --- | --- | --- | --- | --- |
| A | Diamond | 600 | Control | 0.00 | 360 |
| B | Veneer | 600 | STMP | 1.00 | 360 |
| C | Finish | 600 | Monobasic sodium phosphate | 1.00 | 360 |
| D | | 600 | tribasic sodium phosphate | 1.00 | 360 |

The results from temperature raise experiments for mixtures A through D are shown in FIG. 1 and also in table 4 below.

TABLE 4

Test Results for Mixtures A-D

| | A | B | C | D |
| --- | --- | --- | --- | --- |
| Start Temp (° C.) | 23.60 | 21.30 | 22.30 | 22.40 |
| Max (T°) | 37.1 | 24.6 | 35.7 | 36.8 |
| Set Time (min) | 111.00 | >240 | 110.00 | 140.00 |

The additives used in mixtures E-H were as shown in table 5 below:

TABLE 5

Mixtures E-H

| | Test Material | Test Material (g) | Additive | Additive (g) | Water |
| --- | --- | --- | --- | --- | --- |
| E | Diamond Veneer | 600 | TSP | 1.00 | 360 |
| F | Finish Plaster | 600 | DDS | 1.00 | 360 |
| G | | 600 | Sodium Stearate | 0.58 | 360 |
| H | | 600 | SLSA | 1.00 | 360 |

Figure 2:
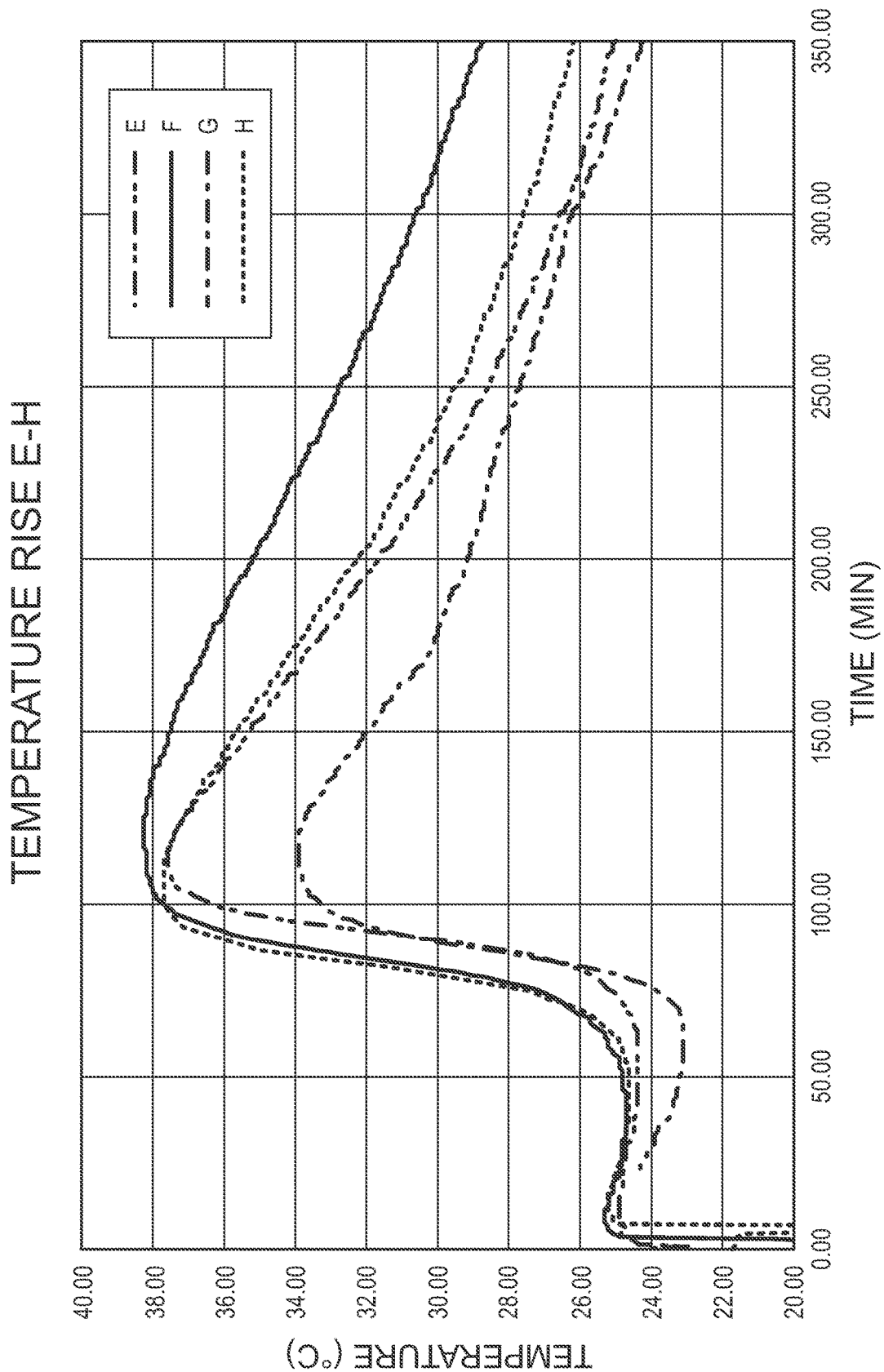
FIG. 2 is a graph reporting temperature rise measurements for construction plaster formulations E through H.

The results from temperature raise experiments for mixtures E through H are shown in FIG. 2 and also in table 6 below.

TABLE 6

Test Results for Mixtures E-H

| | E | F | G | H |
| --- | --- | --- | --- | --- |
| start | 22.90 | 17.50 | 19.90 | 21.70 |
| max | 37.6 | 38.3 | 33.9 | 37.7 |
| Set Time (min) | 109.00 | 116.00 | 110.00 | 100.00 |
| | | 114.00 | 106.00 | 94.00 |

The additives used in mixtures L-N were as shown in Table 7 below:

TABLE 7

Mixtures L-N

| | Test Material | Test Material (g) | Additive | Additive (g) | Water |
| --- | --- | --- | --- | --- | --- |
| L | Diamond Veneer | 600 | Control | 0.00 | 365 |
| M | Finish Plaster | 600 | TSP | 0.50 | 365 |

TABLE 7-continued

Mixtures L-N

| Test Material | Test Material (g) | Additive | Additive (g) | Water |
|---|---|---|---|---|
| O | 600 | Tribasic Phosphate | 1.00 | 365 |
| N | 600 | TSP | 2.00 | 365 |

The results from temperature raise experiments for mixtures L through N are shown in FIG. 3 and also in table 8 below.

TABLE 8

Test Results for Mixtures L-N

| | L | M | N | O |
|---|---|---|---|---|
| Start Temp (C.) | 23.90 | 24.20 | 21.50 | 0.00 |
| Max Temp (C.) | 37.8 | 39.1 | 39.6 | 38.1 |
| Set Time (min) | 118.50 | 133.00 | 149.00 | 129.00 |

The additives used in mixtures P-U were as shown in Table 9 below:

TABLE 9

Mixtures P-U

| | Test Material | Test Material (g) | Additive | Additive (g) | Water |
|---|---|---|---|---|---|
| p | Diamond Veneer Finish Plaster | 600 | Control | 0.00 | 370 |
| q | | 600 | stpp | 0.25 | 370 |
| r | | 600 | stpp | 1.50 | 370 |
| s | | 600 | KTPP | 0.50 | 370 |
| T | | 600 | tsp/stpp | 0.5 tsp 0.5 tspp | 370 |
| U | | 600 | stpp/naPtri-b17 | 0.5/0.5 | 370 |

The results from temperature raise experiments for mixtures L through N are shown in FIG. 4 and also in table 10 below.

TABLE 10

Test Results for Mixtures P-U

| | P | Q | R | S | T | U |
|---|---|---|---|---|---|---|
| start | 22.60 | 0.00 | 22.30 | 17.40 | 22.30 | 17.40 |
| max | 37.2 | 38.7 | 37.1 | 35.8 | 37.1 | 35.8 |
| Set Time (min) | 114.00 | 124.00 | 164.00 | 180.00 | 164.00 | 180.00 |

Additionally, the linearity of the effect of retardation was investigated via linear regression statistical analysis of the Set time versus Additive (Trisodium Phosphate), as reported in FIG. 5.

The additives used in mixtures V-Y were as shown in Table 11:

TABLE 11

Mixtures V-Y

| | Test Material | Test Material (g) | Additive | Additive (g) | Water |
|---|---|---|---|---|---|
| V | Diamond Veneer Finish Plaster | 600 | control | 0.00 | 370 |
| W | | 600 | sodium tripolyphosphate | 1.00 | 370 |
| X | | 600 | sodium pyrophosphate | 1.00 | 370 |
| Y | | 600 | NaCO3 | 1.00 | 370 |

Figure 6:
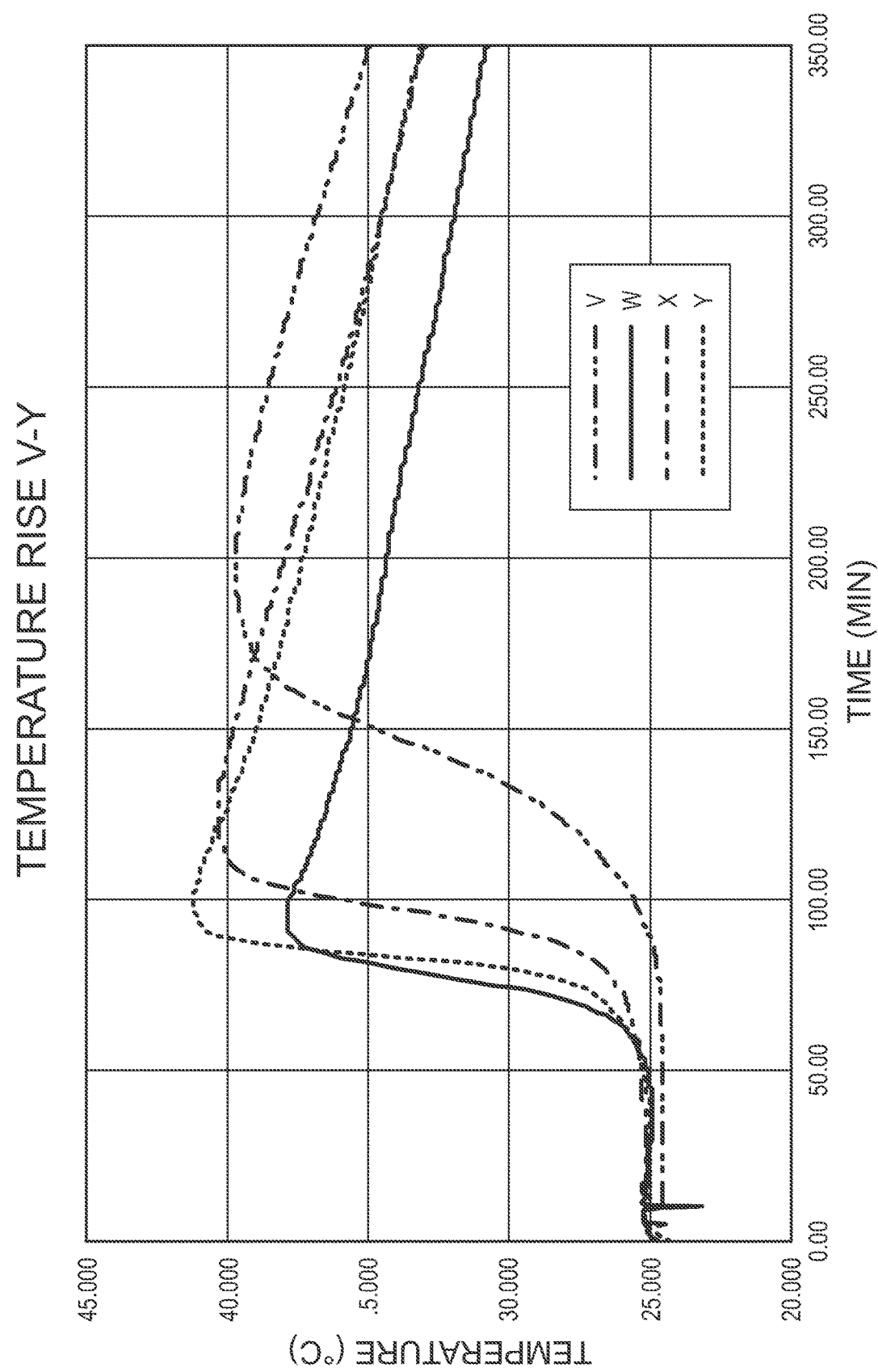
FIG. 6 is a graph reporting temperature rise measurements for construction plaster formulations V through Y.

The results from temperature raise experiments for mixtures V through Y are shown in FIG. 6 and also in table 12 below.

TABLE 12

Test Results for Mixtures V-Y

| | V | W | X | Y |
|---|---|---|---|---|
| start | 24.78 | 24.94 | 23.50 | 24.44 |
| max | 37.83 | 40.28 | 39.67 | 41.17 |
| Set Time (min) | 91.00 | 117.00 | 189.00 | 96.00 |

We claim:

1. A dry construction plaster composition comprising:
   stucco in an amount from about 25 to about 99 wt %;
   hydrated lime in an amount from about 5 to about 50 wt %;
   a phosphate-based lime bucking inhibitor in an amount from about 0.01 to about 1 wt %; and
   a setting reaction controlling agent, wherein the setting reaction controlling agent comprises a combination of a set accelerator and a set inhibitor;
   wherein the set accelerator comprises calcium sulfate anhydrate, calcium sulfate dihydrate, calcium sulfate dihydrate co-ground with sugar, sodium or any mixture thereof; and
   wherein the set inhibitor comprises diethylenetriamine-penta-acetate, pentasodium diethylenetriaminepenta-acetate, potassium bitartrate, citric acid or salt, maleic acid or salt, succinic acid or salt, tartaric acid or salt, or any combination thereof.

2. The dry construction plaster composition of claim 1, wherein the dry construction plaster composition comprises the set accelerator in an amount from about 0.001 to about 0.1 wt %.

3. The dry construction plaster composition of claim 1, wherein stucco in the mixture contains beta stucco and/or hydrated lime is dolomitic hydrated lime.

4. The dry construction plaster composition of claim 1, wherein the phosphate-based lime bucking inhibitor includes at least one orthophosphate and/or at least one polyphosphate.

5. The dry construction plaster composition of claim 1, wherein the phosphate-based lime bucking inhibitor includes trisodium phosphate (TSP), sodium tripolyphosphate (STPP), sodium trimetaphosphate (STMP), or any combination thereof.

6. The dry construction plaster composition of claim 1, wherein the dry construction plaster composition comprises sodium tripolyphosphate, calcium sulfate dihydrate co-ground with sugar, potassium bitartrate and maleic acid.

7. The dry construction plaster composition of claim 1, wherein the dry construction plaster composition further comprises one or more aggregates and/or one or more additives.

8. The dry construction plaster composition of claim 1, wherein the dry construction plaster composition comprises one or more of the following: sand, expanded perlite, clay, a defoamer, a thickener, or any combination thereof.

9. A method for mixing construction plaster slurry or paste, the method comprising mixing the dry construction plaster composition of claim 1 with water.

10. The method of claim 9, wherein the method further comprises adding at least one aggregate and/or at least one additive.

11. The method of claim 9, wherein the dry construction plaster composition is mixed with water in an amount in the range from about 0.20 to about 0.75 liters of water per one kilogram of the dry construction plaster composition.

12. A method for finishing a substrate, the method comprising:
 a) mixing a construction plaster slurry or paste in accordance with claim 9; and
 b) applying the slurry or paste to the substrate.

13. The method of claim 12, wherein the substrate is wallboard.

14. The method of claim 12, wherein step b) is performed by using a hawk, trowel or a spray applicator.

* * * * *